RAILWAY CAR SIDES

Original Filed March 3, 1961 5 Sheets-Sheet 1

INVENTOR.
CARL E. JOHANSSON
DONALD F. LEONHART
BY Samuel Reese

RAILWAY CAR SIDES

Original Filed March 3, 1961 5 Sheets-Sheet 3

INVENTOR.
CARL E. JOHANSSON
DONALD F. LEONHART
BY
Samuel Rosen

RAILWAY CAR SIDES

Original Filed March 3, 1961 5 Sheets-Sheet 3

INVENTOR.
CARL E. JOHANSSON
DONALD F. LEONHART
BY~
Samuel Kuss

RAILWAY CAR SIDES

Original Filed March 3, 1961 5 Sheets-Sheet 4

INVENTOR.
CARL E. JOHANSSON
DONALD F. LEONHART
BY~
Samuel Rosen

RAILWAY CAR SIDES

Original Filed March 3, 1961 5 Sheets-Sheet 5

INVENTOR.
CARL E. JOHANSSON
DONALD F. LEONHART
BY
Samuel Reese

United States Patent Office

Re. 26,131
Reissued Dec. 27, 1966

26,131
RAILWAY CAR SIDES

Carl E. Johansson, South Euclid, Cleveland, and Donald F. Leonhart, Youngstown, Ohio, assignors to The Youngstown Steel Door Company, Cleveland, Ohio, a corporation of Ohio Original No. 3,161,152, dated Dec. 15, 1964, Ser. No. 93,191, Mar. 3, 1961. Application for reissue Nov. 22, 1965, Ser. No. 512,819
3 Claims. (Cl. 105—409)

Matter enclosed in heavy brackets [ ] appears in the original patent but forms no part of this reissue specification; matter printed in italics indicates the additions made by reissue.

This invention relates to railway car sides.

It is an object of this invention to provide sides for railway cars so constructed as to include metallic sheathing and to eliminate separate inside lining for the sides.

A further object is to provide sides for railway cars wherein the sides shall include metallic sheathing which also becomes the lining for the sides.

A further object is to provide sides for railway cars having metallic sheathing and posts so related as to constitute girders, wherein the metallic sheathing forms the webs of the girders and extends in mechanical continuity from end to end of the sides above the door openings provided in the sides.

A further object is to provide sides for railway cars so constructed as to eliminate separate inside lining and embody metallic sheathing formed to incorporate lading band anchors.

A further object is to provide sides for railway cars so constructed as to eliminate separate inside lining and embody metallic sheathing and posts and wherein the sheathing shall be so formed as to incorporate lading band anchors and the posts shall reinforce the lading band anchors.

A further object is to provide railway cars having sides embodying metallic sheathing that serves as inside lining for the sides and in which door openings are formed and wherein threshold plates project outwardly beyond the sides in the door openings and are supported by brackets so constructed as to function as track bracket supports.

A further object is to provide sides for railway cars which shall effect reductions in weight and cost of the cars.

Other objects of the invention will become clear as the description thereof proceeds.

In the drawings forming part of this specification:

Figure 1:
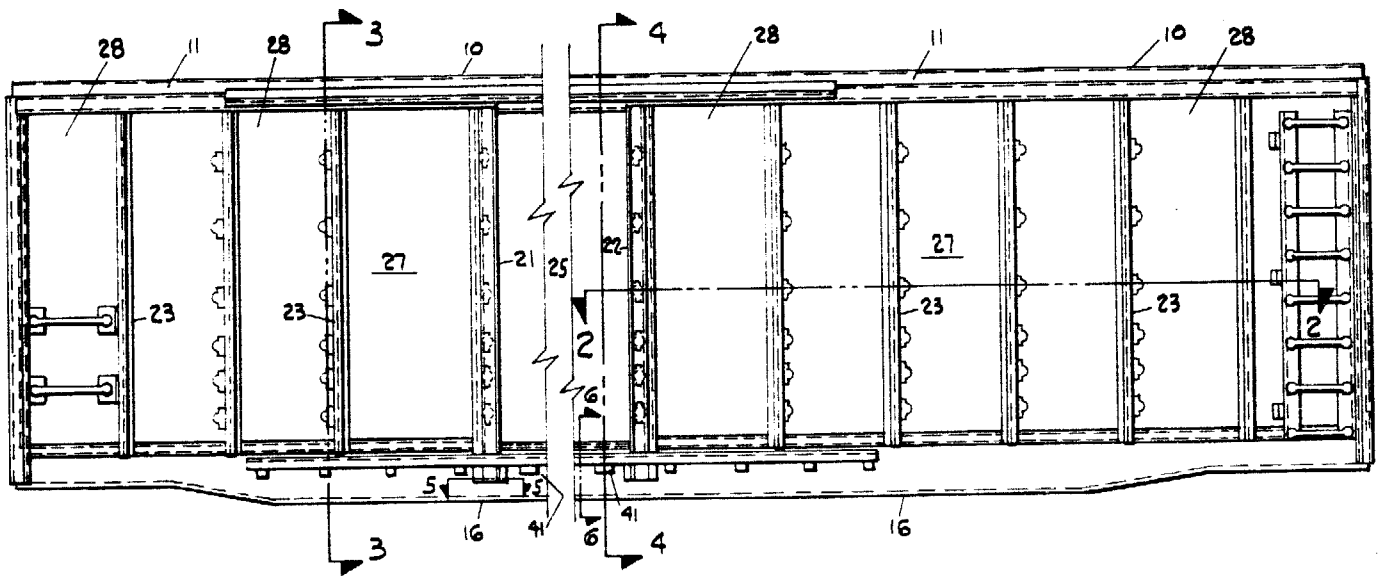
FIG. 1 is an elevation of a car side embodying the instant invention, a portion being broken away.

Referring first to the embodiment of the invention illustrated in FIGURES 1–7 of the drawings, the numeral 10 designates a metallic side for railway cars embodying the instant invention. The car side 10 includes a side plate 11 which extends substantially from end to end of the car side along the top thereof. The side plate 11 is substantially Z-shaped in section, having an upstanding flange 12 carrying a roof-supporting inwardly extending flange 13, an outwardly extending web 14 and a downwardly extending flange 15.

A side sill 16 extends substantially from end to end of the car side along the bottom thereof. The side sill 16 embodies an angle member 17 having an upstanding flange 18 and an inwardly extending flange 19, and is reinforced by an angular member 20 welded to the underside of flange 19.

The side plate and side sill constitute the upper and lower chords of the car side girder in which front and rear door posts 21 and 22 of similar construction and intermediate and corner posts 23 and 24 form the vertical reinforcing members. The side plate, side sill and door posts define a door opening 25 in the car side adapted to be closed by a door (not shown) movable longitudinally on the outside of the car side upon a supporting track 26. The web of the car side girder is formed by metallic sheathing 27 in the form of sheets 28 which extend between the door posts and intermediate corner posts.

The door posts 21 and 22 are formed of two angular preferably formed members 29 and 30. Flanges 31 and 32 of these members lie parallel to the car side and in spaced relationship to each other. Flange 32 abuts and is welded to outwardly extending flange 33 of member 29 intermediate its length. Flange 31 of member 29 is abutted by inwardly extending flange 34 of member 30 intermediate its length. There is thus provided a door post having a box section beyond which the flanges 31 and 33 extend. One of the sheets 28 of the car side girder is welded to the extension of flange 31 and extends and is welded to the adjacent intermediate post 23. The remaining sheets of the web extend between and are welded to the intermediate and corner posts. The extension of flange 33 serves for attachment of a post strip (not shown) or a door stop (not shown).

Figure 4:
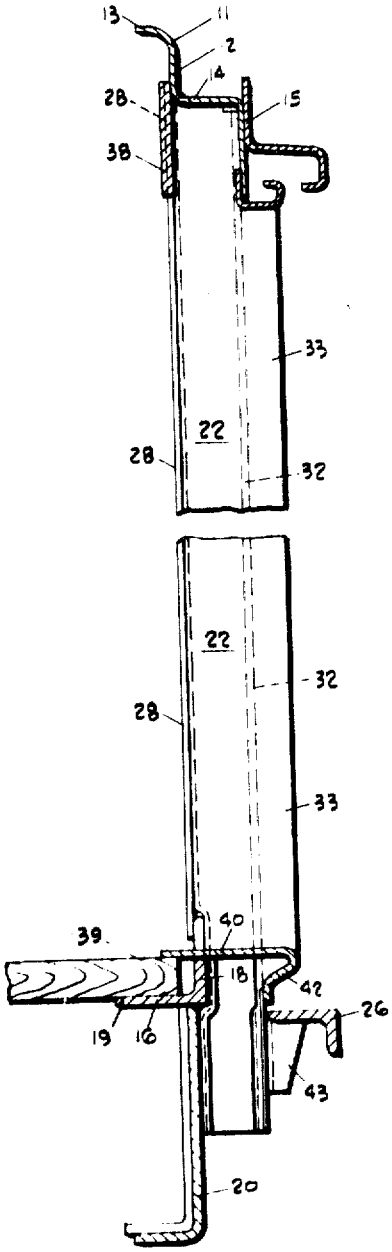
FIG. 4 is a vertical section taken on line 4—4 of FIG. 1.
Figure 6:
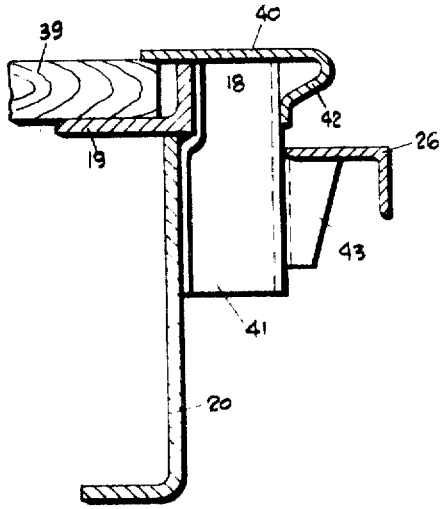
FIG. 6 is a vertical section taken on line 6—6 of FIG. 1.
Figure 5:
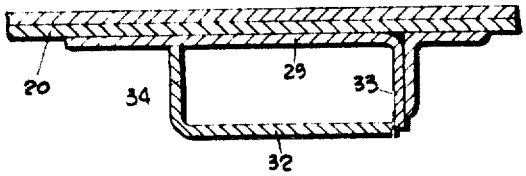
FIG. 5 is a horizontal section taken on line 5—5 of FIG. 1.

The door posts 21 and 22 and intermediate and corner posts 23 and 24 lie on the outside of the side sill 16 to which they are welded. The door posts extend downwardly below the side sill and are also welded to the side sill reinforcement 20 as shown in FIG. 4. All of the posts extend upwardly to the web 14 of the side plate and lie inwardly of the side plate flange 15 and are welded to the web and flange 15. The inward extent of all of the posts is limited to the plane of the side plate flange 12.

The metallic sheets 28 of the car side sheathing are disposed inwardly of the side plate and side sill and are welded to the upstanding flange 12 of the side plate and to the upstanding flange 18 of the side sill.

The metallic sheathing is exposed on the inside of the car so as to serve as the car lining. By reason of this construction the metallic sheathing serves as a medium to which metallic bands can be fastened to securely retain lading in place. To this end the flange 31 of each of the door posts and the sheathing adjacent to the intermediate posts are pressed outwardly at vertically spaced intervals as indicated at 35. The outwardly pressed portions 35 are also pressed outwardly as indicated at 36. The portions 35 are pressed outwardly an amount equal to the thickness of a bar 37 which is welded to each of the portions 35 and which lies in spaced relationship to the portion 36. Anchors are thus provided in the sheathing to which lading bands can be fastened.

Figure 2:
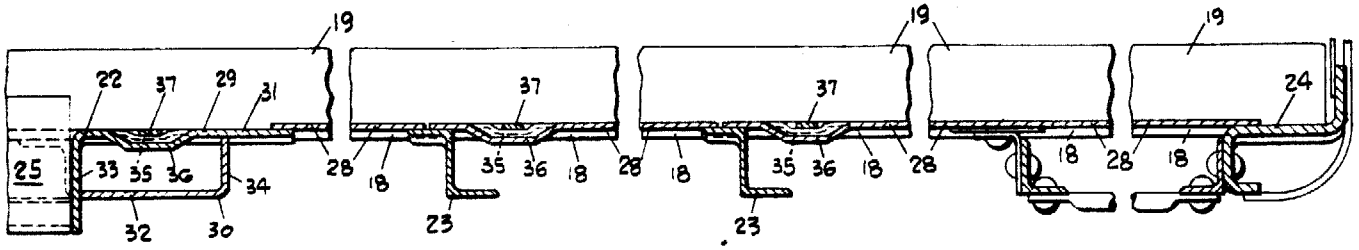
FIG. 2 is a horizontal section taken on line 2—2 of FIG. 1.
Figure 7:
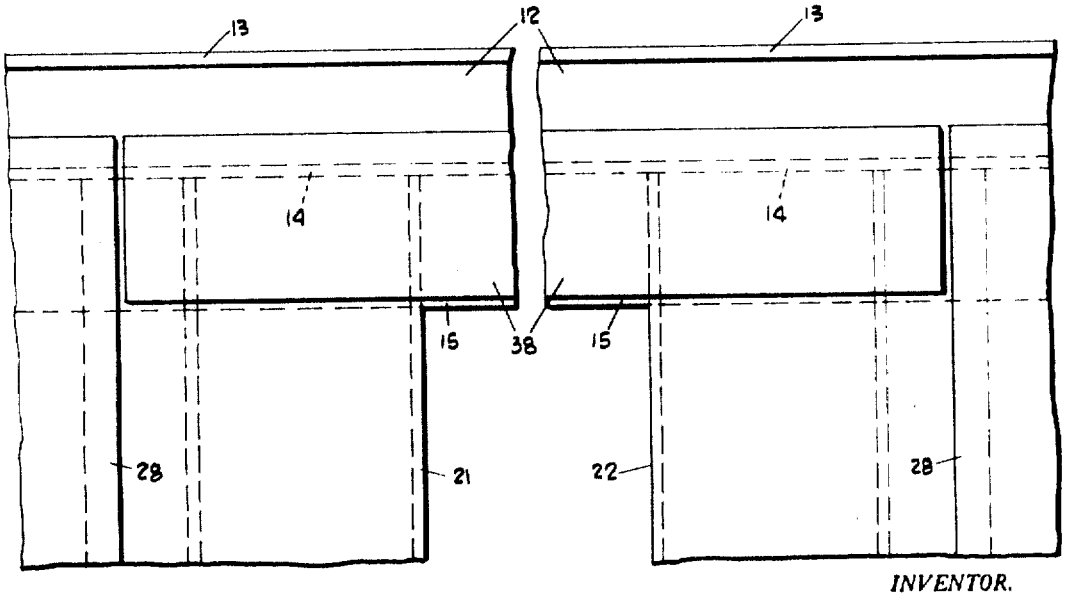
FIG. 7 is an inside elevation of upper part of car side in the area of the door opening.

As shown in FIGURES 2, 4 and 7 the metallic sheathing terminates in the usual manner at the door posts so that the full strength of the sheathing is not realized in the car construction. Where the sheathing stops at the door posts and is not secured to the side plate in the door opening it serves only as a web of the side wall girder from the door posts to the ends of the car. Since it is not continuous across the door opening it cannot have a column action which is set up along the side plate when the car is struck from either end. For this same reason it cannot serve to reinforce the side plate against cross bending in the door opening where the weakest section of the car superstructure occurs. According to the instant invention the strength of the sheathing is utilized whereby it functions as a web in the car side girder and as a stress carrying member which reinforces the column action of the side plate and strengthens the latter in bending in the door opening.

To accomplish this a metallic member 38, preferably a plate, is welded to the upstanding flange 12. Member 38 extends across the door opening and is welded to the door posts 21 and 22. Member 38 terminates at its ends adjacent to the sheathing on opposite sides of the door opening and is welded to the sheathing as shown in FIG. 7. The latter is thereby made mechanically continuous from end to end of the car and functions as a stress carrying member which reinforces the side plate.

In the door opening the upstanding leg 18 of the side sill is reduced in height so that it terminates in the upper plane of the car floor 39. A threshold plate 40 overlaps and protects the floor. Threshold plate 40 extends outwardly across flange 18 and terminates in line with the outer edge of the extending portion of flange 33 of each of the door posts. A plurality of spaced Z-shaped brackets 41 support the threshold plate outwardly of the side sill. These brackets are welded to the side sill flange 18 and to the side sill reinforcement 20. The threshold plate rests upon the brackets 41 and extends outwardly thereof. The threshold plate is folded back to provide a flange 42 which is welded to the brackets.

According to the instant invention the brackets 41 are of such character that they can function additionally as supports for brackets 43 which support the door track 26. These brackets are welded to the brackets 41 thereby avoiding the need for securing the track brackets 43 directly to the side sill reinforcement and substantially reducing the size of the track brackets. Beyond the door opening larger track brackets B secured directly to the side sill reinforcement must be used.

Figure 10:
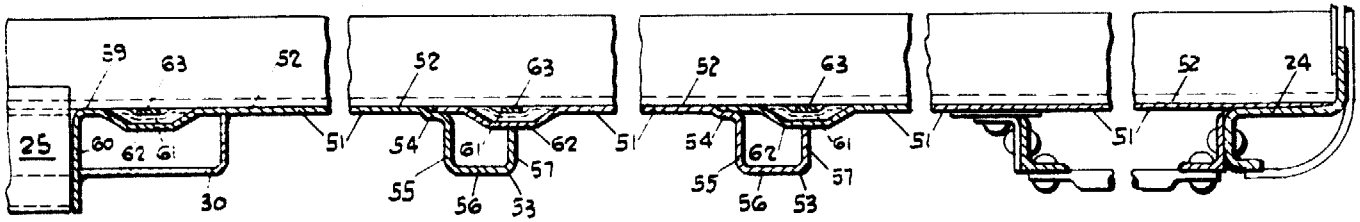
FIG. 10 is a horizontal section similar to FIG. 2 of the car side shown in FIG. 8.
Figure 3:
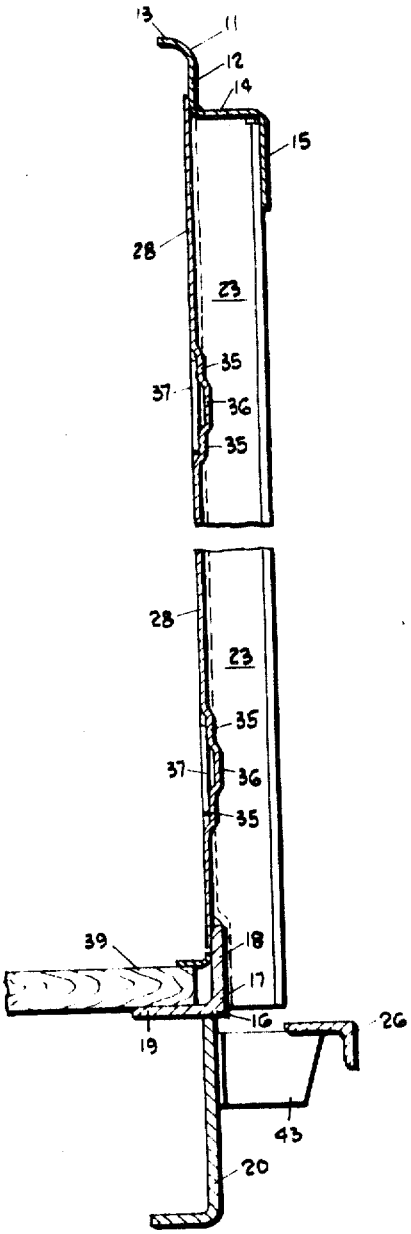
FIG. 3 is a vertical section taken on line 3—3 of FIG. 1.
Figure 8:
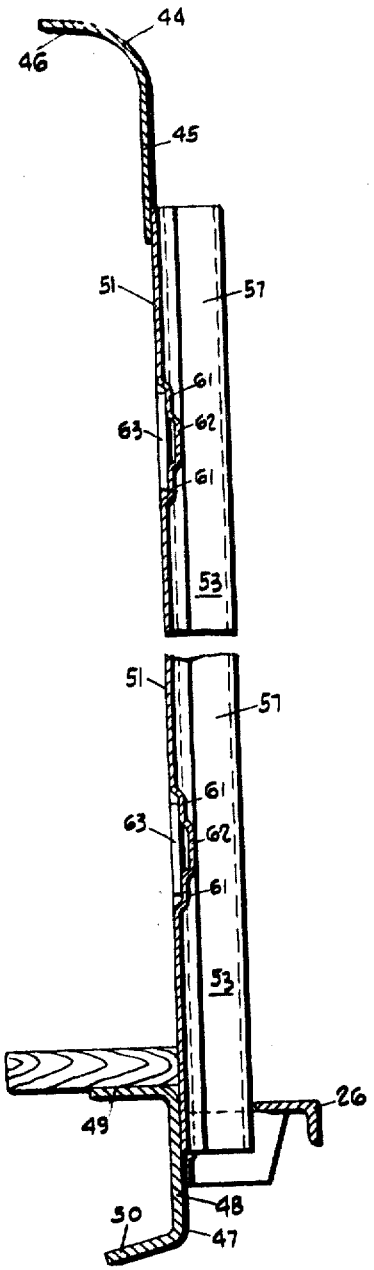
FIG. 8 is a vertical section similar to FIG. 3 showing another embodiment of the invention.
Figure 9:
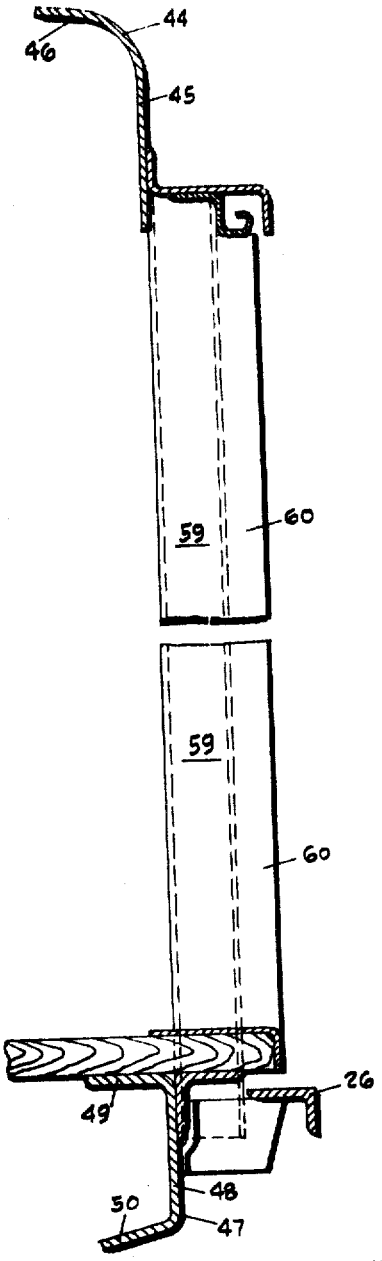
FIG. 9 is a vertical section similar to FIG. 4 of the car side shown in FIG. 8.

In the form of the invention illustrated in FIGURES 8–10 the side plate 44 is the form of a plate which provides a vertical flange 45 and an inwardly extending roof supporting flange 46. The side sill is in the form of a channel 47 whose web 48 is vertical and alined with the flange 45 of the side plate and whose flanges 49 and 50 extend inwardly.

In the considered embodiment of the invention the metallic sheets 51, which form the sheathing 52 of the car side, and the intermediate posts 53 are formed integrally. The metallic sheets are offset outwardly adjacent to one vertical edge thereof as indicated at 54. From the offset portion the sheets are bent outwardly, then rearwardly parallel to the sheets and then inwardly. The flanges 55, 56 and 57 thus formed constitute channel-shaped intermediate posts whose flange 57 is narrower than the flange 55 for the reason which will hereinafter appear. The margins of the sheets opposite the intermediate posts are disposed in and welded to the offset portions 54 so that the inside of the sheathing lies in the same plane throughout.

The metallic sheets 51 adjacent to the door opening constitute a portion of the door posts 58 (not shown) and 59.

These sheets at the door opening are bent to provide an outwardly extending flange 60 similar to the flange 33 of the first described form of the invention. These sheets are combined with angular members 30 to complete the door posts which are similar to the door posts 21 and 22.

By reason of the construction just described the metallic sheets 51 and the intermediate and door posts 53, 58 and 59 lie on the outside of the side plate 44 and side sill 47 and are welded to the vertical flange 45 of the side plate and the web 48 of the side sill. Since the sheathing and posts can all be disposed on the outside of the side plate and side sill the welding of these members can be accomplished in one position.

As in the first described embodiment of the invention, the metallic sheets 51 are pressed outwardly at vertically spaced intervals as shown at 61. The portions 61 are further pressed outwardly as shown at 62. Bars 63 are welded to the portions 61 in flush relationship with the sheets 51 and in spaced relationship to the portions 62. Anchors are thus provided to which bands can be fastened to secure lading in position.

The flanges 57 of the intermediate posts 53 are disposed along the vertical center line of the portions 62 and are welded to these positions. The intermediate posts serve thereby to reinforce the anchors so that the sheathing can better resist the stresses imposed upon it by the lading bands. If desired, the flanges 57 can be made substantially the same width as the flanges 55. In this event the flanges 57 will be coped to follow the contour of the outwardly pressed portions 61 and 62 and will be welded to and reinforce the sheets and the outwardly pressed portions.

It will be apparent that numerous changes and modifications in the details of the invention will be clear to those skilled in the art. It is intended, therefore, that all such modifications and changes be comprehended within this invention which is to be limited only by the scope of the claims appended hereto.

We claim:

1. In a railway car having a side plate extending substantially the length of the car, a side sill extending substantially the length of the car, metallic sheathing extending between and secured to said side plate and side sill, said sheathing being exposed to view on the outside and the inside of the car, a door opening provided in said sheathing, the top and bottom of said door opening being defined by said side plate and sill, respectively, spaced door posts and intermediate posts extending between said side plate and side sill on the outside of said sheathing, said sheathing extending from said door posts to the ends of said car, means securing said door posts and intermediate posts to said side plate, sill and sheathing, said door posts defining the width of the door opening, a member secured to said side plate across the door opening, said member being alined with said sheathing, and means directly securing said member to said sheathing on opposite sides of the door opening and making said sheathing a mechanically continuous stress-carrying column member along said side plate.

2. In a railway car having a side plate extending substantially the length of the car, a side sill extending substantially the length of the car, single metallic sheathing comprising a plurality of metallic sheets secured together and extending between and secured to the outside of said side plate and side sill, said sheathing being exposed to view on the outside and the inside of the car, a door opening provided in said sheathing, the top and bottom of said door opening being defined by said side plate and sill, respectively, spaced door posts secured to said sheathing, certain of said metallic sheets being provided with vertically spaced, outwardly pressed portions adjacent to and spaced from one vertical edge thereof, said certain metallic sheets adjacent to the other vertical edge thereof having a flange extending outwardly of said outwardly pressed portions, a flange extending laterally therefrom in spaced relationship to said outwardly pressed portions and a flange extending inwardly from said latter flange to said outwardly pressed portions, said inwardly extending flange being secured to said outwardly pressed portions, said flanges constituting integral intermediate posts of said car, said door posts and intermediate posts extending continuously between said side plate and side sill on the outside of said sheathing, means securing said door posts to said side plate and side sill, said door posts defining the width of the door opening, and bars secured to the inside of said sheathing, said bars extending across said outwardly pressed portions and constituting lading band anchors therewith accessible from the inside of the car.

*3. In the railway car of claim 1, said metallic sheathing including single thickness sheets each of which are exposed on both the inside and outside of said car, at least some of said sheets being provided with outwardly pressed portions with lading band anchor bars secured thereacross and at least some of said intermediate posts having a channel-shaped cross section with its open side facing and its side sections supporting said outwardly pressed portions.*

References Cited by the Examiner

The following references, cited by the Examiner, are of record in the patented file of this patent, or the original patent.

UNITED STATES PATENTS

| | | | |
|---|---|---|---|
| 1,224,052 | 4/1917 | Worth | 105—409 |
| 1,826,859 | 10/1931 | Anderson. | |
| 2,041,651 | 5/1936 | Tangerman. | |
| 2,123,441 | 7/1938 | Schlesinger. | |
| 2,223,667 | 12/1940 | Mussey. | |
| 2,226,667 | 12/1940 | Love | 105—369 |
| 2,716,383 | 8/1955 | Johnson | 105—369 |
| 2,839,013 | 6/1958 | Gunnell et al. | |
| 2,869,481 | 1/1959 | Beauchamp | 105—409 |
| 2,930,332 | 6/1961 | Cook et al. | |
| 2,987,014 | 6/1961 | Sleeman | 105—369 |
| 3,014,436 | 12/1961 | Johnson. | |
| 3,089,436 | 4/1963 | Buckley | 105—369 |

ARTHUR L. LA POINT, *Primary Examiner.*

D. E. HOFFMAN, *Assistant Examiner.*